United States Patent

Adolphi et al.

[15] 3,681,375

[45] Aug. 1, 1972

[54] IMIDAZOLE ACETALS

[72] Inventors: Heinrich Adolphi, Limburgerhof, Upper Palatinate, Anna Steimmig, Ludwigshafen, Rhine; Hermann Spaenig, Limburgerhof, Upper Palatinate, all of Germany

[73] Assignee: Badische Anilin- & Soda-Fabrik Aktiengesellschaft, Ludwigshafen, Rhine, Pfalz, Germany

[22] Filed: May 28, 1970

[21] Appl. No.: 41,612

Related U.S. Application Data

[62] Division of Ser. No. 563,964, July 11, 1966, Pat. No. 3,531,494.

[30] Foreign Application Priority Data

July 22, 1965 Germany.....................B 82,952

[52] U.S. Cl.................................260/309, 424/273
[51] Int. Cl. ...........................................C07d 49/36
[58] Field of Search......................................260/309

[56] References Cited

UNITED STATES PATENTS

| | | | |
|---|---|---|---|
| 2,380,698 | 7/1945 | Jayne et al.....................260/309 |
| 2,404,299 | 7/1946 | Kyrides..........................260/309 |
| 2,710,870 | 6/1955 | Lawson..........................260/309 |
| 3,178,446 | 4/1965 | Sannicolo......................260/209 |

FOREIGN PATENTS OR APPLICATIONS 656,675  6/1965  Belgium........................260/309

OTHER PUBLICATIONS

Roe J. Chem. Soc. (London) 1963, pages 2195–2200. QD1.C6

Koenig et al. Chem. Abst. Vol. 61, column 5534 (1964) QD1.A51 (Abstract Belgium Patent 630,161)

Beilsteins Hanbuch der Organischen Chemie 4th ed. First supplement (1910-1919) volume 23, page 103. Berlin, Sprinoer, 1936 QD251.B4

Burgess et al. Proc. Soc. Exptl. Biol. Med. Vol. 28, pages 115–116 (1930) QD1.58

*Primary Examiner*—Natalie Trousof
*Attorney*—Johnston, Root, O'Keeffe, Keil, Thompson & Shurtleff

[57] ABSTRACT

Imidazoles and salts thereof, the imidazoles being N-substituted by alkyl having 12 or 13 carbon atoms, alkoxyalkyl wherein the alkoxy portion has 2–13 carbon atoms and the alkyl portion has 1–13 carbon atoms, dimethoxy- or diethoxyethyl or unsubstituted or substituted phenoxy-methoxyethyl, and uses in insecticide compositions in admixture with pyrethrins, carbamates or phosphoric esters in the weight ratio of 1:10 to 1:1.

6 Claims, No Drawings

IMIDAZOLE ACETALS

RELATED APPLICATION

This application is a division of our application Ser. No. 563,964, filed July 11, 1966, now U.S. Pat. No. 3,531,494.

INTRODUCTION

The use of imidazole for controlling injurious insects has been proposed by Pence (J. econ. Ent. 56, pages 1 to 7, 1963). Imidazole is supposed to function as antimetabolite for histamine and nicotinic acid and especially when mixed with boric acid, displays an effect on textile pests. The effect of this mixture is however only slight.

DESCRIPTION OF THE INVENTION

An object of the invention is to provide new imidazole compounds. The new imidazoles are those having the formula

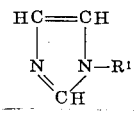

in which $R^1$ denotes alkyl having twelve or thirteen carbon atoms; alkoxyalkyl wherein the alkoxy portion has two to 13 carbon atoms and the alkyl portion has one to thirteen carbon atoms; or the radical dimethylacetal, diethylacetal, phenylmethylacetal, methylphenylmethylacetal, or chlorophenylmethylacetal. The acetal radicals are 2,2-dimethoxyethyl, 2,2-diethoxyethyl, 2-phenoxy-2-methoxyethyl, 2-methylphenoxy-2-methoxyethyl and 2-chlorophenoxy-2-methoxyethyl. These imidazoles, or the salts of these compounds, have a marked synergistic action on pyrethrins, carbamates or phosphoric esters. The known insecticidal action of these active ingredients is considerably enhanced by the said imidazole derivatives and/or their salts.

The imidazole derivatives may be prepared by cyclization synthesis of imidazoles by prior art methods, by dehydrogenation of imidazolines or by further conversion of imidazoles, mainly by N-substitution. The N-substitution may be carried out by known methods by reaction of imidazoles or their salts with ethyl halides or esters of oxalic acid or carbonic acid or by reaction with alcohols in contact with water-eliminating catalysts. By adding imidazoles on to reactive double bonds, N-substitution products are also formed. The imidazoles may also be modified by methylolation or conversion of functional groups, for example, esterification, conversion of chlorine into amino groups or by salt formation. For example the production of dodecylimidazolylacetaldehyde—O,N—acetal having the formula

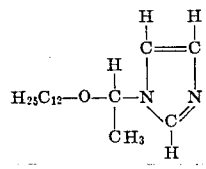

may be carried out as follows:

318 parts (by weight) of vinyl dodecyl ether, 68 parts of imidazole and 1 part of hydroquinone are heated for 5 hours at 180° C. while stirring.

The reaction mixture is then vacuum distilled. Dodecylimidazolylacetaldehyde-O,N-acetal distills at 171° to 174° C. at 1.7 mm Hg in a yield of 206 parts (i.e. 73.5 percent of the theory).

Insecticides according to this invention may be prepared by mixing the imidazole derivatives with known insecticidal active ingredients. They may also contain conventional solid or liquid carriers and/or other active ingredients.

The salts include salts with inorganic or organic acids, for example hydrochloric acid, sulfuric acid, phosphoric acid, nitric acid, formic acid, acetic acid, trichloroacetic acid, p-toluenesulfonic acid, phenol, cresol and methylsulfuric acid.

Pyrethrins include not only unpurified or purified pyrethrum extracts but also the pyrethrins isolated from these extracts and the synthetic analogues, for example allethrin.

Carbamates include for example the α-naphthyl ester of N-methylcarbamic acid (Carbaryl), isopropoxyphenylmethyl carbamate (propoxur) and 4-dimethylamino-3,5-xylylmethyl carbamate (Zectran).

Phosphoric esters include for example O,O-dimethyl-S-(1,2-di-(ethoxycarbonyl)-ethyl)-phosphorus dithioate (Malathion), O,O-dimethyl-S-methylcarbamoylmethylphosphorus dithioate (Dimethoate) and O,O-dimethyl-O-4-bromo-2,5-dichlorophenylphosphorus dithioate (Bromophos).

The imidazole derivatives and the active ingredients may be used in any relative Proportions. We prefer a mixing ratio of imidazole derivative to active ingredient of 10:1 to 1:1 parts by weight.

The following table gives a selection of active compounds with their melting points (mp) or boiling point (bp) at the reduced pressure indicated:

| | | |
|---|---|---|
| S3 | ⟨N−C₁₂H₂₅ imidazole⟩ | B.p.₁ 150° to 152° C. |
| S5 | ⟨N−C₁₃H₂₇ imidazole⟩ | B.p.₄ 170° C. |
| S23 | ⟨N−CH(CH₃)−O−C₂H₅ imidazole⟩ | B.p.₈.₅ 95° to 97° C. |
| S28 | ⟨N−CH(CH₃)−O−C₁₂−C₁₄H₂₅−H₂₇ imidazole⟩ | (Mixture) B.p.₂ 150° C. |
| S33 | ⟨N−CH₂−CH(O−CH₃)(O−CH₃) imidazole⟩ | B.p.₀.₇ 101° to 102° C. |
| S34 | ⟨N−CH₂−CH(O−C₂H₅)(O−C₂H₅) imidazole⟩ | B.p.₁ 110° to 112° C. |
| S35 | ⟨N−CH₂−CH(O−CH₃)(O−C₆H₃(CH₃)Cl) imidazole⟩ | M.p. 60.5° C. |

The following known phosphoric acid esters are used for the following experiments:

I. 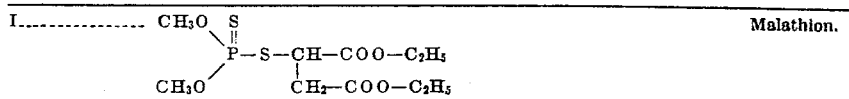 Malathion.

II. 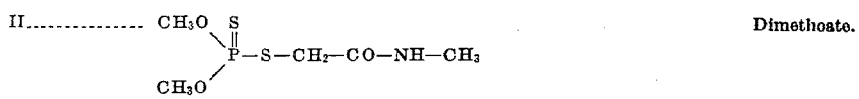 Dimethoate.

III. 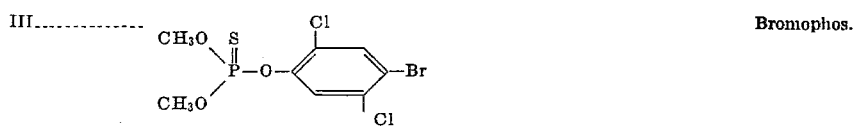 Bromophos.

IV. 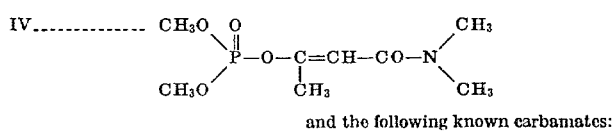

and the following known carbamates:

V. 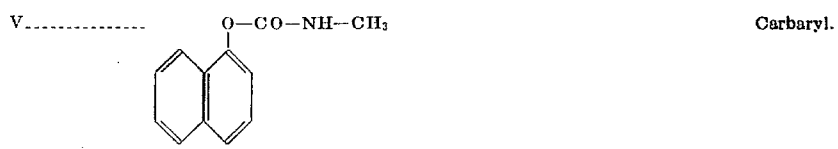 Carbaryl.

VI. 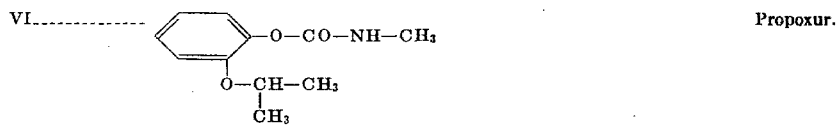 Propoxur.

VII. 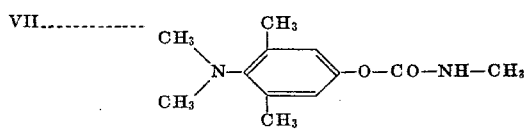

The following known synergists are used as comparison substances:

VIII. 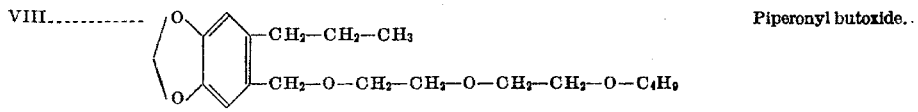 Piperonyl butoxide.

IX. 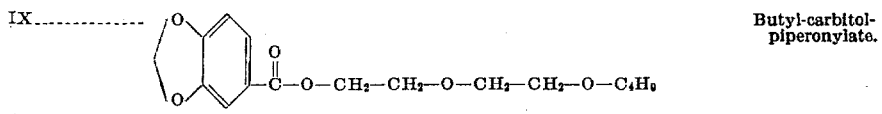 Butyl-carbitol-piperonylate.

The action of the above-mentioned substances is illustrated in the following Examples.

EXAMPLE 1

Synergistic effect on pyrethrins:
Petri dishes having a diameter of 10 cm are wetted with an acetone solution of the active ingredient so that a coating of 0.1 mg of pyrethrin and 1 mg of synergist is contained in each dish. Fifty granary weevils (Sitophilus granaria L.) are placed in each of the dishes after the solvent has evaporated. The effect is determined after sixty minutes and stated in percentage mortality (M). 100 percent means that all insects are dead.

In the following Table $S = No.$ of synergist (as in the lists above); $mg$ = amount of synergist used; $M$ = percentage mortality; $P$ = pyrethrin; $A - 10$ percent = amount of pyrethrin which gives 10 percent mortality; $E$ = effect of the mixture given as percentage mortality.

| S | mg | M | P | A–10% | E |
|---|----|---|---|-------|---|
| 3 | 1 mg | 8 | +P | 0.1 mg | 100 |
| 5 | 1 mg | 1 | +P | 0.1 mg | 100 |
| 23 | 1 mg | 10 | +P | 0.1 mg | 100 |
| 28 | 1 mg | 0 | +P | 0.1 mg | 100 |
| 33 | 1 mg |  | +P | 0.1 mg | 100 |
| 34 | 1 mg | 0 | +P | 0.1 mg | 100 |
| IX | 1 mg | 0 | +P | 0.1 mg | 91 |
| Boric acid | 1 mg | 0 |  |  |  |
| 3 | 0.5 mg |  | +P | 0.1 mg | 99 |
| 5 | 0.5 mg |  | +P | 0.1 mg | 100 |
| 28 | 0.5 mg |  | +P | 0.1 mg | 99 |
| VIII | 0.5 mg |  | +P | 0.1 mg | 90 |
| IX | 0.5 mg |  | +P | 0.1 mg | 81 |
| Imidazole | 1 mg. |  | +P | 0.1 mg | 24 |
| Imidazole | 1 mg |  |  |  | 0 |
| Imidazole | 1 mg |  | +Boric Acid | 1 mg | 0 |

EXAMPLE 2

Synergistic action on Allethrin:
(Experimental procedure as in Example 1)

| | | | M |
|---|---|---|---|
| Allethrin | 0.2 mg | | 30 |
| Allethrin | 0.1 mg | | 15 |
| S. 3 | 1 mg + 0.1 mg Allethrin | | 100 |
| S. 3 | 0.5 mg + 0.1 mg Allethrin | | 88 |
| S. 5 | 1 mg + 0.1 mg Allethrin | | 97 |
| S. 5 | 0.5 mg + 0.1 mg Allethrin | | 73 |
| S. 23 | 1 mg + 0.1 mg Allethrin | | 97 |
| S. 28 | 1 mg + 0.1 mg Allethrin | | 98 |
| S. 28 | 0.5 mg + 0.1 mg Allethrin | | 99 |
| S. IX | 1 mg + 0.1 mg Allethrin | | 62 |
| S. IX | 0.5 mg + 0.1 mg Allenthrinttm 44 | | |
| S. VIII | 0.5 mg + 0.1 mg Allethrin | | 45 |

EXAMPLE 3

Synertistic action on phosphoric esters:

The procedure of Example 1 is followed; the effect is determined after 2 hours.

In the Table, Mal = Malathion; A—32 percent = amount of Malathion required to give 32 percent mortality.

| S | mg | M | Mal | A-32% | E |
|---|---|---|---|---|---|
| 3 | 1 mg | 8 | + Mal | 0.1 mg | 90 |
| 23 | 1 mg | 10 | + Mal | 0.1 mg | 97 |
| VIII | 1 mg | 4 | + Mal | 0.1 mg | 12 |

| S | | | M |
|---|---|---|---|
| 3 | 0.4 mg+ 0.02 mg | IV | 74 |
| 3 | + 0.02 mg | IV | 7 |
| 28 | 0.4 mg+ 0.02 mg | IV | 55 |
| IX | 0.4 mg+ 0.02 mg | IV | 1 |
| | 0.4 mg+ 0.02 mg | IV | 17 |
| 3 | 0.5 mg+ 0.1 mg | III | 43 |
| 3 | + 0.1 mg | III | 0 |
| IX | 0.5 mg+ 0.1 mg | III | 3 |
| VIII | 0.5 mg+ 0.1 mg | III | 2 |

EXAMPLE 4

Synergistic effect on pyrethrins:

Houseflies in light CO₂ narcosis receive 1 cu.mm. of an acetone solution of the active ingredient applied to the ventral abdomen. Mortality is determined four hours later and the LD 50 (letal dose 50 percent) is calculated therefrom.

In the Table the calculated values are given in γ/fly for the amount of pyrethrin used in each case.

| Pyrethrin | | | LD 50 | 0.12 | γ/fly |
|---|---|---|---|---|---|
| Pyr. + S. | 3 | 1 : 10 | LD 50 | 0.043 | γ/fly |
| Pyr. + S. | 28 | 1 : 10 | LD 50 | 0.025 | γ/fly |
| Pyr. + S. | 33 | 1 : 10 | LD 50 | 0.079 | γ/fly |
| Pyr. + S. | 35 | 1 : 10 | LD 50 | 0.06 | γ/fly |

By adding the synergists, the amount of pyrethrin required to kill 50% of the flies is substantially decreased. The LD 50 of the pure substances was in all cases more than 10 γ/fly and was therefore not determined more exactly.

EXAMPLE 5

Synergistic effect on carbamates:

Petri dishes having a diameter of 10 cm are wetted with an acetone solution of the active ingredient and houseflies are placed in the dishes after the solvent has evaporated. Four hours later the mortality of the flies is determined.

| | | | M |
|---|---|---|---|
| V | 2 mg | | 0% |
| V | 1 mg + S. 3 | 1 mg | 100% |
| V | 0.5 mg + S. 3 | 1 mg | 100% |
| | S. 3 | 1 mg | 8% |
| V | 2 mg + S. 28 | 1 mg | 100% |
| V | 1 mg + S. 28 | 1 mg | 100% |
| V | 0.5 mg + S. 28 | 1 mg | 79% |
| VI | 0.01 mg | | 30% |
| VI | 0.005 mg + S. 28 | 0.025 mg | 85% |
| VII | 0.1 mg | | 48% |
| VII | 0.1 mg + S. 3 | 0.05 mg | 97% |
| VII | 0.1 mg + S. 3 | 0.1 mg | 94% |
| VII | 0.1 mg + S. 3 | 0.5 mg | 98% |
| VII | 0.1 mg + S. 28 | 0.05 mg | 60% |
| VII | 0.1 mg + S. 28 | 0.5 mg | 77% |

In the above tables, the Roman numerals designate the compounds earlier identified by corresponding Roman numerals.

EXAMPLE 6

Preparation of the compound having the formula

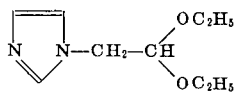

100 parts (by weight) of bromoacetaldehyde diethylacetal is introduced at 50° C. into a solution of 45 parts of sodium imidazole in 160 parts of dimethylformamide. The reaction mixture is kept at 50° C. for about 3 hours and then allowed to cool. The precipitated sodium bromide is suction filtered and the filtrate evaporated in vacuo. After the residue has been fractionally distilled, 45 parts of imidazole-N-acetaldehyde diethylacetal is obtained having a boiling point of 110°–112° C. at 1 mm Hg (49 percent of the theory).

EXAMPLE 7

Preparation of the compound having the formula

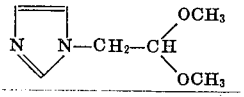

65 parts of sodium imidazole is dissolved in 200 parts of dimethylformamide and 90 parts of chloroacetaldehyde dimethylacetal is added. The solution is heated at 80° C. for 8 hours. After cooling, the sodium chloride is suction filtered, the filtrate is evaporated in vacuo and the residue fractionally distilled. 55 parts of imidazole-N-acetaldehyde dimethylacetal with a boiling point of 101°–102° C. at 0.7 mm Hg is obtained. This represents a yield of 49 percent of the theory.

EXAMPLE 8

Preparation of the compound having the formula

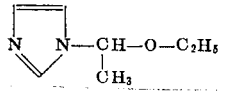

136 parts of imidazole is heated for 10 hours at 180° C. in an autoclave with 200 parts of vinylethyl ether and 0.1 part of hydroquinone. 250 parts of acetaldehyde ethylimidazolyl-O,N-acetal is obtained from the fraction which boils at 95°–97° C. at 8.5 mm Hg (yield 88 percent of the theory).

The invention is hereby claimed as follows:
1. An imidazole of the formula

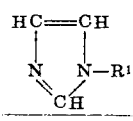

in which $R^1$ denotes 2,2-dimethoxyethyl, 2,2-diethoxyethyl, 2-phenoxy-2-methoxyethyl, 2-methylphenoxy-2-methoxyethyl or 2-chlorophenoxy-2-methoxyethyl.

2. An imidazole as claimed in claim 1 wherein $R^1$ denotes 2,2-dimethoxyethyl.

3. An imidazole as claimed in claim 1 wherein $R^1$ denotes 2,2-diethoxyethyl.

4. An imidazole as claimed in claim 1 wherein $R^1$ denotes 2-phenoxy-2-methoxyethyl.

5. An imidazole as claimed in claim 1 wherein $R^1$ denotes 2-methylphenoxy-2-methoxyethyl.

6. An imidazole as claimed in claim 1 wherein $R^1$ denotes 2-chlorophenoxy-2-methoxyethyl.

* * * * *